United States Patent
Li et al.

(10) Patent No.: US 11,211,318 B2
(45) Date of Patent: Dec. 28, 2021

(54) BUMP LAYOUT FOR COPLANARITY IMPROVEMENT

(71) Applicant: Taiwan Semiconductor Manufacturing Company, Ltd., Hsinchu (TW)

(72) Inventors: Ling-Wei Li, Hsinchu (TW); Cheng-Lin Huang, Hsinchu (TW); Min-Tar Liu, Jhubei (TW); Fu-Kang Chiao, Hsinchu (TW); Matt Chou, Hsinchu (TW); Chun-Yen Lo, Hsinchu (TW); Che-Jung Chu, Hsinchu (TW); Wen-Ming Chen, Zhunan Township (TW); Kuo-Chio Liu, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 0 days.

(21) Appl. No.: 16/448,755

(22) Filed: Jun. 21, 2019

(65) Prior Publication Data
US 2020/0105654 A1 Apr. 2, 2020

Related U.S. Application Data

(60) Provisional application No. 62/738,929, filed on Sep. 28, 2018.

(51) Int. Cl.
| | |
|---|---|
| *H01L 21/48* | (2006.01) |
| *H01L 23/498* | (2006.01) |
| *H01L 23/00* | (2006.01) |
| *G06F 30/392* | (2020.01) |
| *G06F 30/398* | (2020.01) |
| *G06F 113/18* | (2020.01) |

(52) U.S. Cl.
CPC ...... *H01L 23/49838* (2013.01); *G06F 30/392* (2020.01); *G06F 30/398* (2020.01);
(Continued)

(58) Field of Classification Search
CPC combination set(s) only.
See application file for complete search history.

(56) References Cited

U.S. PATENT DOCUMENTS

| | | |
|---|---|---|
| 8,686,560 B2 | 4/2014 | Parvarandeh et al. |
| 10,586,778 B2 | 3/2020 | Uesaka |

(Continued)

FOREIGN PATENT DOCUMENTS

| | | |
|---|---|---|
| CN | 102214627 A | 10/2011 |
| DE | 4101042 C1 | 2/1992 |

(Continued)

*Primary Examiner* — Moin M Rahman
(74) *Attorney, Agent, or Firm* — Slater Matsil, LLP

(57) ABSTRACT

A method includes receiving a first design for conductive bumps on a first surface of an interposer, the conductive bumps in the first design having a same cross-section area; grouping the conductive bumps in the first design into a first group of conductive bumps in a first region of the first surface and a second group of conductive bumps in a second region of the first surface, where a bump pattern density of the second region is lower than that of the first region; forming a second design by modifying the first design, where modifying the first design includes modifying a cross-section area of the second group of conductive bumps in the second region; and forming the conductive bumps on the first surface of the interposer in accordance with the second design, where after being formed, the first group of conductive bumps and the second group of conductive bumps have different cross-section areas.

19 Claims, 11 Drawing Sheets

(52) U.S. Cl.
CPC .... *H01L 21/4853* (2013.01); *H01L 23/49816* (2013.01); *H01L 24/11* (2013.01); *H01L 24/16* (2013.01); *H01L 24/17* (2013.01); *H01L 24/81* (2013.01); *G06F 2113/18* (2020.01); *H01L 2224/11462* (2013.01); *H01L 2224/11464* (2013.01); *H01L 2224/16227* (2013.01); *H01L 2224/1703* (2013.01); *H01L 2224/17132* (2013.01); *H01L 2224/17517* (2013.01); *H01L 2224/81815* (2013.01); *H01L 2924/15311* (2013.01); *H01L 2924/384* (2013.01)

(56) References Cited

U.S. PATENT DOCUMENTS

| | | | |
|---|---|---|---|
| 2006/0231952 A1* | 10/2006 | Kim | H05K 3/3436 257/738 |
| 2006/0279315 A1 | 12/2006 | Takagi et al. | |
| 2014/0042612 A1* | 2/2014 | Liu | H01L 23/5227 257/734 |
| 2018/0102313 A1 | 4/2018 | Shih | |
| 2020/0118984 A1 | 4/2020 | Chen et al. | |

FOREIGN PATENT DOCUMENTS

| | | | |
|---|---|---|---|
| JP | 2006344824 A | 12/2006 | |
| JP | 2014072487 A | 4/2014 | |
| KR | 20020088501 A | 11/2002 | |
| KR | 20060110044 A | 10/2006 | |
| KR | 20110119342 A | 11/2011 | |
| TW | 201814856 A | 4/2018 | |
| TW | 201830598 A | 8/2018 | |
| WO | 2017179574 A1 | 10/2017 | |

* cited by examiner

| Pattern Density (%) | <15 | 15~25 | >25 |
|---|---|---|---|
| Adjusted Bump Opening Size | R''=1.35R~1.55R<br>Or<br>R1''=1.35R1~1.55 R1<br>R2''=1.35R2~1.55 R2 | R'=1.1R~1.25R<br>Or<br>R1'=1.1R1~1.25 R1<br>R2'=1.1R2~1.25 R2 | R<br>Or<br>R1<br>R2 |

Fig. 5

| Pattern Density (%) | <15 | 15~25 | >25 |
|---|---|---|---|
| Original Bump Pitch (μm) | P3 | P2 | P1 |
| Adjusted Bump Pitch (μm) | P1 | P1 | P1 |

Fig. 6

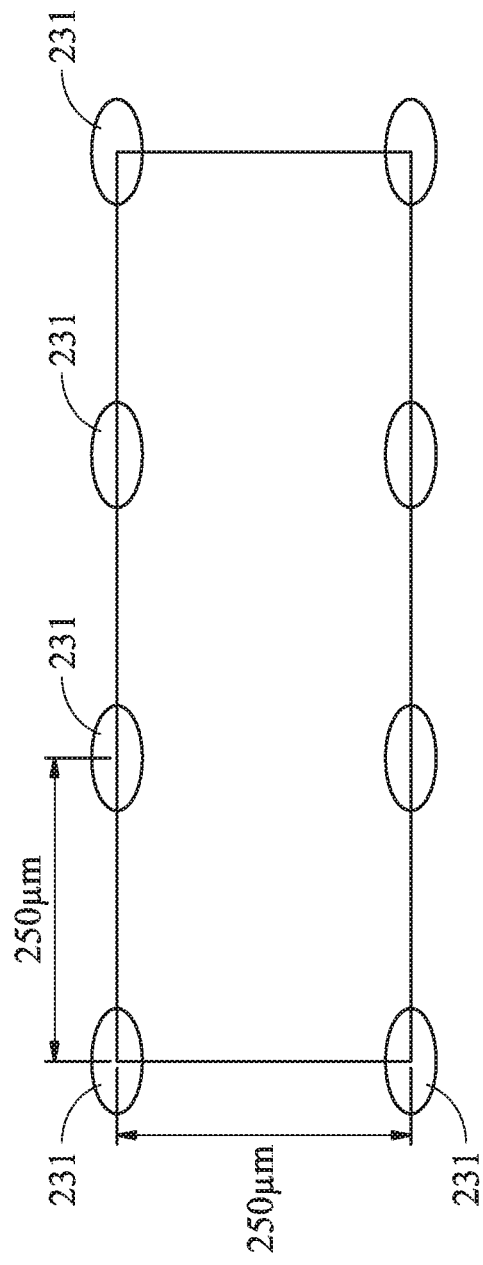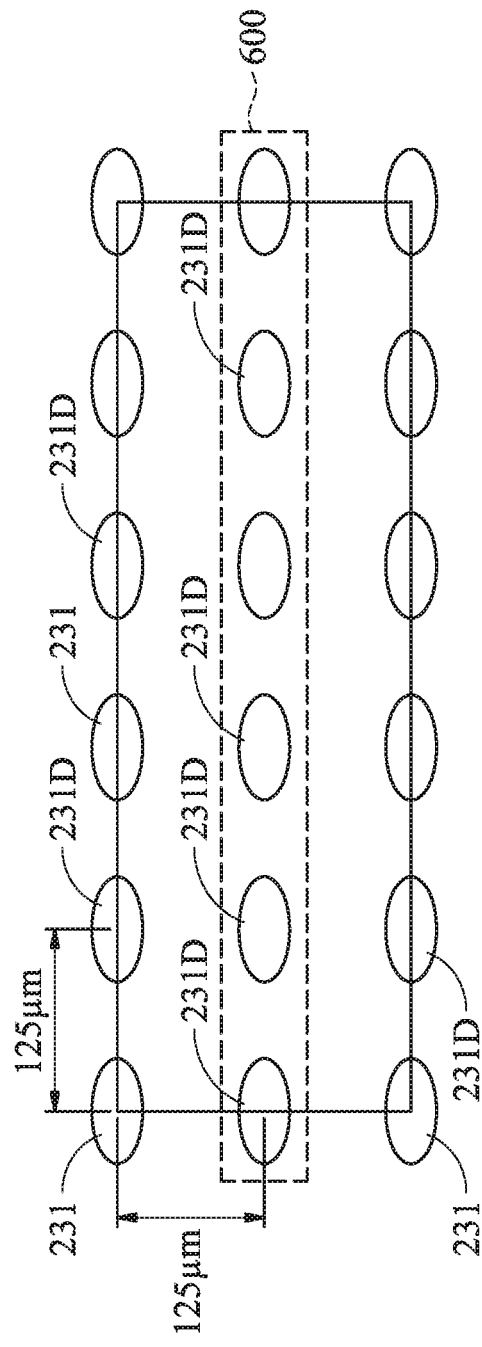
Fig. 7A
Fig. 7B

BUMP LAYOUT FOR COPLANARITY IMPROVEMENT

PRIORITY CLAIM AND CROSS-REFERENCE

This application claims priority to U.S. Provisional Patent Application No. 62/738,929, filed Sep. 28, 2018, entitled "Bump Layout for Coplanarity Improvement," which application is hereby incorporated by reference in its entirety.

BACKGROUND

The semiconductor industry has experienced rapid growth due to continuous improvements in the integration density of a variety of electronic components (e.g., transistors, diodes, resistors, capacitors, etc.). For the most part, this improvement in integration density has come from repeated reductions in minimum feature size, which allows more components to be integrated into a given area.

As the demand for shrinking electronic devices has grown, a need for smaller and more creative packaging techniques of semiconductor dies has emerged. An example of such packaging systems is Package-on-Package (PoP) technology. In a PoP device, a top semiconductor package is stacked on top of a bottom semiconductor package to provide a high level of integration and component density. Another example is a Chip-On-Wafer-On-Substrate (CoWoS) structure. In some embodiments, to form a CoWoS structure, a plurality of semiconductor chips are attached to a wafer, and a dicing process is performed next to separate the wafer into a plurality of interposers, where each of the interposers has one or more semiconductor chips attached thereto. The interposer with semiconductor chips(s) attached is referred to as a Chip-On-Wafer (CoW) structure, in some embodiments. The CoW structure is then attached to a substrate (e.g., a printed circuit board) to form a CoWoS structure. These and other advanced packaging technologies enable production of semiconductor devices with enhanced functionalities and small footprints.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 5 illustrates a method of improving the coplanarity of conductive bumps, in an embodiment.

FIG. 6 illustrates a method of improving the coplanarity of conductive bumps, in an embodiment.

FIGS. 7A and 7B illustrate the conductive bumps within a surface area of an interposer before and after applying the method illustrated in FIG. 6, in an embodiment.

DETAILED DESCRIPTION

Figure 1:
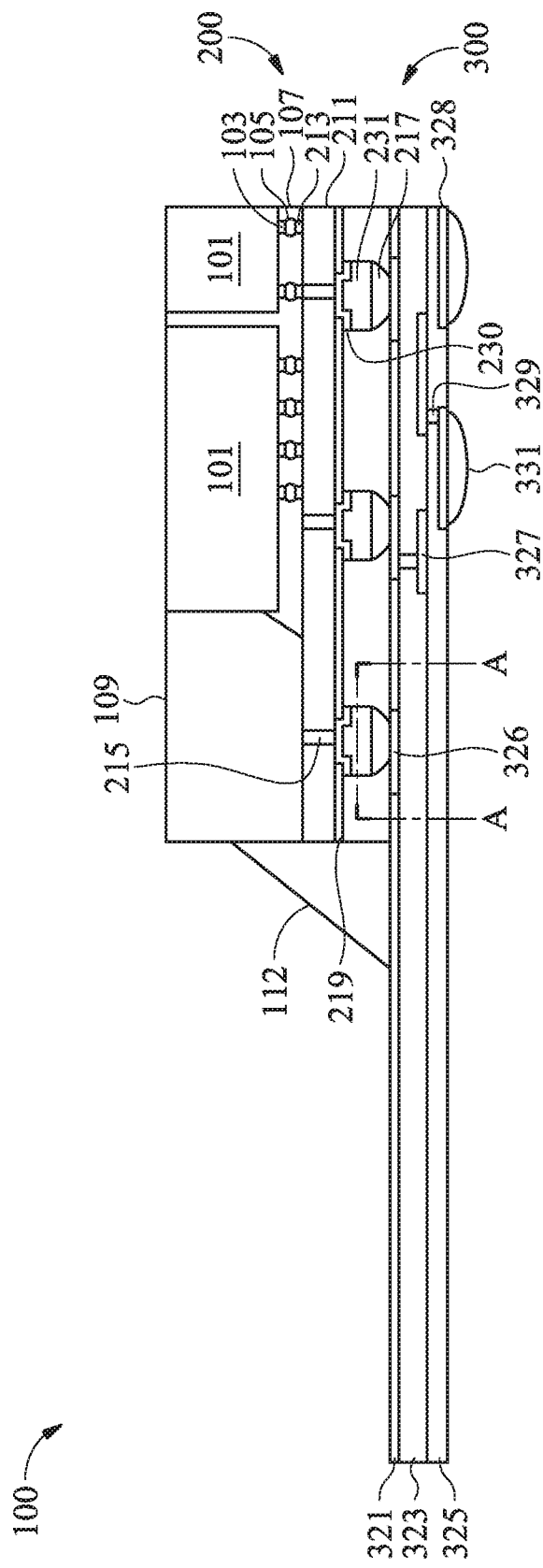
FIG. 1 illustrates a cross-sectional view of a semiconductor device, in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. Throughout the description, unless otherwise specified, like reference numerals in different figures refer to the same or similar component formed by a same or similar method using a same or similar material(s).

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Embodiments of present disclosure are discussed in the context of forming conductive bumps, an in particular, forming conductive bumps with improved planaraity on a surface (e.g., a lower surface) of an interposer. In some embodiments, the size (e.g., cross-section area) of the conductive bumps in a region with low bump pattern density is increased relative to the size of the conductive bumps in a region with high bump pattern density. In some embodiments, dummy bumps are formed between conductive bumps in a region with low bump pattern density to decrease the bump pitch in the low bump pattern density region, while no dummy bump is formed in a high bump pattern density region. In some embodiments, dummy bumps are formed in a perimeter region of the surface of the interposer to reduce the bump pitch in the perimeter region, while bump pitches in other regions of the surface surrounded by the perimeter region remain unchanged (e.g., no dummy bumps are formed in the other regions).

FIG. 1 illustrates a cross-sectional view of a portion of a semiconductor device 100, in accordance with some embodiments. The semiconductor device 100 has a chip-on-wafer-on-substrate (CoWoS) structure. For simplicity, FIG. 1 only shows a left portion of the semiconductor device 100, and the right portion of the semiconductor device 100 may be the same as (e.g., symmetric to) or similar to the left portion shown in FIG. 1, as one skilled in the art will readily appreciate.

To form the semiconductor device 100, one or more dies 101 (may also be referred to as semiconductor dies, chips, or integrated circuit (IC) dies) are attached to an interposer 200 to form a chip-on-wafer (CoW) structure, and the CoW structure is then attached to a substrate 300 (e.g., a printed circuit board) to form a chip-on-wafer-on-substrate (CoWoS) structure. The dies 101 are a same type of dies (e.g., memory dies, or logic dies), in some embodiments. In other embodiments, the dies 101 are of different types, e.g., some dies 101 are logic dies and others dies 101 are memory dies.

Each of the dies 101 includes a substrate, electrical components (e.g., transistors, resistors, capacitors, diodes, or the like) formed in/on the substrate, and an interconnect structure over the substrate connecting the electrical components to form functional circuits of the die 101. The die 101 also includes conductive pillars 103 (also referred to as die connectors) that provide electrical connection to the circuits of the die 101. For simplicity, not all features of the die 101 are illustrated.

The substrate of the die 101 may be a semiconductor substrate, doped or undoped, or an active layer of a silicon-on-insulator (SOI) substrate. Generally, an SOI substrate comprises a layer of a semiconductor material such as silicon, germanium, silicon germanium, SOI, silicon germanium on insulator (SGOI), or combinations thereof. Other substrates that may be used include multi-layered substrates, gradient substrates, or hybrid orientation substrates.

The electrical components of the die 101 comprise a wide variety of active devices (e.g., transistors) and passive devices (e.g., capacitors, resistors, inductors), and the like. The electrical components of the die 101 may be formed either within or on the substrate of the die 101 using any suitable methods. The interconnect structure of the die 101 comprises one or more metallization layers (e.g., copper layers) formed in one or more dielectric layers, and is used to connect the various electrical components to form functional circuitry. In an embodiment the interconnect structure is formed of alternating layers of dielectric and conductive material (e.g., copper) and may be formed through any suitable process (such as deposition, damascene, dual damascene, etc.).

One or more passivation layers may be formed over the interconnect structure of the die 101 in order to provide a degree of protection for the underlying structures of the die 101. The passivation layer may be made of one or more suitable dielectric materials such as silicon oxide, silicon nitride, low-k dielectrics such as carbon doped oxides, extremely low-k dielectrics such as porous carbon doped silicon dioxide, combinations of these, or the like. The passivation layer may be formed through a process such as chemical vapor deposition (CVD), although any suitable process may be utilized.

Conductive pads may be formed over the passivation layer and may extend through the passivation layer to be in electrical contact with the interconnect structure of the die 101. The conductive pads may comprise aluminum, but other materials, such as copper, may alternatively be used.

Conductive pillars 103 of the die 101 are formed on the conductive pads to provide conductive regions for electrical connection to the circuits of the die 101. The conductive pillars 103 may be copper pillars, contact bumps such as microbumps, or the like, and may comprise a material such as copper, tin, silver, or other suitable material.

Looking at the interposer 200 (may also be referred to as a workpiece), which includes a substrate 211, through vias 215 (also referred to as through-substrate vias (TSVs)), conductive pads 213 on an upper surface of the substrate 211, under-bump-metallurgy (UBM) structures 230 at a lower surface of the substrate 211, and conductive bumps 231 (may also be referred to as bumps, connectors, or conductive pillars) on the UBM structures 230. FIG. 1 also illustrates a surface dielectric layer 219 (e.g., a lowest dielectric layer) of the substrate 211. The UBM structures 230 extend through the surface dielectric layer 219 to be electrically coupled with conductive features (e.g., through vias 215) of the interposer 200.

The substrate 211 may be, e.g., a silicon substrate, doped or undoped, or an active layer of a silicon-on-insulator (SOI) substrate. However, the substrate 211 may alternatively be a glass substrate, a ceramic substrate, a polymer substrate, or any other substrate that may provide a suitable protection and/or interconnection functionality.

In some embodiments, the substrate 211 may include electrical components, such as resistors, capacitors, signal distribution circuitry, combinations of these, or the like. These electrical components may be active, passive, or a combination thereof. In other embodiments, the substrate 211 is free from both active and passive electrical components therein. All such combinations are fully intended to be included within the scope of this disclosure.

Through vias 215 extend from the upper surface of the substrate 211 to the lower surface of the substrate 211, and provide electrical connections between the conductive pads 213 and the conductive bumps 231. The through vias 215 may be formed of a suitable conductive material such as copper, tungsten, aluminum, alloys, doped polysilicon, combinations thereof, and the like. A barrier layer may be formed between the through vias 215 and the substrate 211. The barrier layer may comprise a suitable material such as titanium nitride, although other materials, such as tantalum nitride, titanium, or the like, may alternatively be utilized.

In an embodiment, the UBM structures 230 comprise three layers of conductive materials, such as a layer of titanium, a layer of copper, and a layer of nickel. However, there are many suitable arrangements of materials and layers, such as an arrangement of chrome/chrome-copper alloy/copper/gold, an arrangement of titanium/titanium tungsten/copper, or an arrangement of copper/nickel/gold, that are suitable for the formation of the UBM structures 230. Any suitable materials or layers of material that may be used for the UBM structures 230 are fully intended to be included within the scope of the present disclosure.

The UBM structure 230 may be formed by: forming an opening in the surface dielectric layer 219 to expose a conductive feature (e.g., a conductive pad electrically coupled to the through vias 215) in the substrate 211, forming a seed layer over the surface dielectric layer 219 and along the interior of the opening in the surface dielectric layer 219, forming a patterned mask layer (e.g., photoresist) over the seed layer, forming (e.g., by plating) the conductive material(s) in the openings of the patterned mask layer and over the seed layer, removing the mask layer and remove portions of the seed layer on which the conductive material(s) is not formed. Other methods for forming the UBM structures 230 are possible and are fully intended to be included within the scope of the present disclosure.

The conductive bumps 231 may be any suitable type of external contacts, such as microbumps, copper pillars, controlled collapse chip connection (C4) bumps, a copper layer, a nickel layer, a lead free (LF) layer, an electroless nickel electroless palladium immersion gold (ENEPIG) layer, a Cu/LF layer, a Sn/Ag layer, a Sn/Pb, combinations of these, or the like.

In some embodiments, the conductive bumps 231 may be or include metal pillars such as copper pillars formed by, e.g., a plating process such as electroplating or electro-less plating. The conductive bumps 231 may be formed by: forming a patterned mask layer (e.g., photoresist) with openings that expose the UBM structure 230, forming (e.g., by plating) the conductive material(s) in the openings of the patterned mask layer and over the UBM structures 230, and removing the mask layer. Other methods for forming the conductive bumps 231 are possible and are fully intended to be included within the scope of the present disclosure. In the example of FIG. 1, the UBM structure 230 and the respective conductive bump 231 have a same width.

In some embodiment, the size of the opening in the mask layer (e.g., photoresist) used to form (e.g., through a plating process) the conductive bump 231 corresponds to (e.g., is equal to), thus determines, the cross-section area of the conductive bump 231. The cross-section area of the conductive bump 231 refers to the area of the cross-section of the conductive bump 231 along the cross-section A-A in FIG. 1, in some embodiments. The cross-section of the conductive bump 231 may have a circular shapes or an oval shapes (see, e.g., FIGS. 4A and 4B), as examples. For ease of discussion, the openings in the patterned mask layer (e.g., photoresist) used to form (e.g., through a plating process) the conductive bumps 231 may be referred to as bump openings hereinafter.

As illustrated in FIG. 1, the conductive pillar 103 of the dies 101 are bonded to the conductive pads 213 of the interposer 200 by, e.g., solder regions 105. A reflow process may be performed to bond the dies 101 to the interposer 200.

After the dies 101 are bonded to the interposer 200, an underfill material 107 is formed between the dies 101 and the interposer 200. The underfill material 107 may, for example, comprise a liquid epoxy that is dispensed in a gap between the dies 101 and the interposer 200, e.g., using a dispensing needle or other suitable dispensing tool, and then cured to harden. As illustrated in FIG. 1, the underfill material 107 fills the gap between the die 101 and the interposer 200, and may also fill gaps between sidewalls of the dies 101.

Next, a molding material 109 is formed over the interposer 200 and around the dies 101. The molding material 109 also surrounds the underfill material 107. The molding material 109 may comprise an epoxy, an organic polymer, a polymer with or without a silica-based filler or glass filler added, or other materials, as examples. In some embodiments, the molding material 109 comprises a liquid molding compound (LMC) that is a gel type liquid when applied. The molding material 109 may also comprise a liquid or solid when applied. Alternatively, the molding material 109 may comprise other insulating and/or encapsulating materials. The molding material 109 is applied using a wafer level molding process in some embodiments. The molding material 109 may be molded using, for example, compressive molding, transfer molding, molded underfill (MUF), or other methods.

Next, the molding material 109 is cured using a curing process, in some embodiments. The curing process may comprise heating the molding material 109 to a predetermined temperature for a predetermined period of time, using an anneal process or other heating process. The curing process may also comprise an ultra-violet (UV) light exposure process, an infrared (IR) energy exposure process, combinations thereof, or a combination thereof with a heating process. Alternatively, the molding material 109 may be cured using other methods. In some embodiments, a curing process is not included.

After the molding material 109 is formed, a planarization process, such as chemical and mechanical planarization (CMP), may be performed to remove excess portions of the molding material 109 from over the dies 101, such that the molding material 109 and the dies 101 have a coplanar upper surface. As illustrated in FIG. 1, the molding material 109 is conterminous with the substrate 211.

In the example of FIG. 1, the CoW structure includes the interposer 200, dies 101, the underfill material 107 and the molding material 109. Next, the CoW structure is bonded to the substrate 300, which may be a printed circuit board (PCB), to form a CoWoS structure.

Looking at the substrate 300, in some embodiments, the substrate 300 is a multiple-layer circuit board. For example, the substrate 300 may include one more dielectric layers 321/323/325 formed of bismaleimide triazine (BT) resin, FR-4 (a composite material composed of woven fiberglass cloth with an epoxy resin binder that is flame resistant), ceramic, glass, plastic, tape, film, or other supporting materials. The substrate 300 may include electrically conductive features (e.g., conductive lines 327 and vias 329) formed in/on the substrate 300. As illustrated in FIG. 1, the substrate 300 has conductive pads 326 formed on an upper surface of the substrate 300, and conductive pads 328 formed on a lower surface of the substrate 300, which conductive pads 326/328 are electrically coupled to the conductive features of the substrate 300. External connectors 331, such as solder balls, copper pillars, or copper pillars with solder on top, are formed on the conductive pads 328, as illustrated in FIG. 1.

The interposer 200 is bonded to the substrate 300. A reflow process may be performed to electrically and mechanically coupled the interposer 200 to the substrate 300 through, e.g., solder regions 217. Next, an underfill material 112 is formed between the interposer 200 and the substrate 300. The underfill material 112 may be the same as or similar to the underfill material 107, and may be formed by a same or similar formation method, thus details are not repeated. After the interposer 200 is bonded to the substrate 300, the CoWoS structure in FIG. 1 is formed.

As the integration density of the semiconductor devices 100 increases, more dies 101 may be attached to the interposer 200 to achieve more functionalities within a semiconductor package. As a result, the size of the interposer 200 may increase. As the size of the interposer 200 increases, maintaining coplanarity (e.g., flatness, level) of the conductive bumps of the interposer 200, such as the conductive bumps 231 at the lower surface of the interposer 200, becomes increasingly difficult. Coplanarity of the conductive bumps 231 may be measured by a maximum offset between end surfaces of the conductive bumps 231 distal to the substrate 211. For example, the coplanarity of the conductive bumps 231 may be measured by calculating the maximum difference (e.g., the largest offset) between the lowermost surfaces of the conductive bumps 231 located in a center region and in a perimeter region of the interposer 200. As another example, the coplanarity of the conductive bumps 231 may be measured using commercially available equipment using suitable measurement methods such as Peak-to-Least Mean Square (LMS) method. Therefore, a larger difference between the lowermost surfaces of the conductive bumps indicates a worse coplanarity, which may lead to issues such as cold-joint or bridging (e.g., electrical short between conductive bumps), thus lowering the yield of the manufacturing process. Various embodiment methods and structures in the present disclosure improve the coplanarity of the conductive bumps 231, thus improving the reliability of the semiconductor device 100 formed and improving the production yield.

Figure 2:
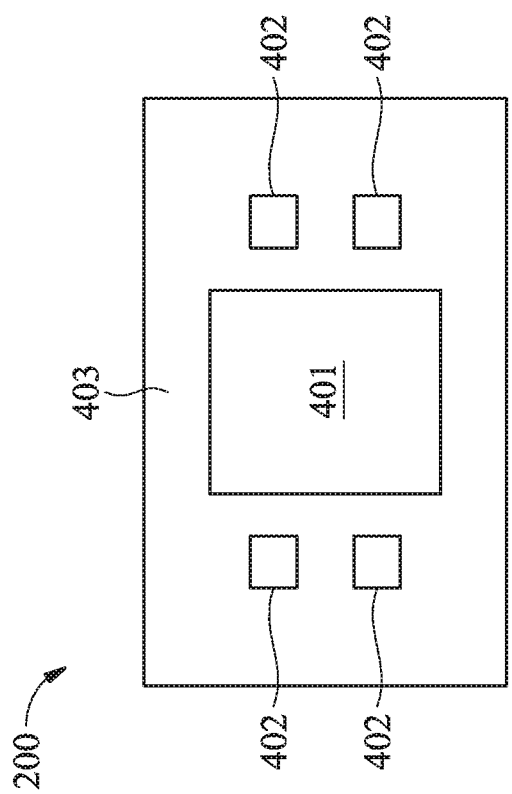
FIG. 2 illustrates a layout for conductive bumps on a surface of an interposer, in some embodiments.

FIG. 2 illustrates a layout (may also be referred to as a layout design, or a design) for conductive bumps 231 on the lower surface of the interposer 200 of FIG. 1, in some embodiments. Therefore, FIG. 2 is a plan view of the lower surface of the interposer 200. In particular, FIG. 2 illustrates regions (e.g., 401, 402, and 403) of the lower surface of the interposer 200 where the conductive bumps 231 are formed, and each of the regions may have a different bump pattern density, details regarding the layout of FIG. 2 (e.g., how to determine the boundaries of the different regions) are discussed hereinafter. For simplicity, the conductive bumps 231 in the regions (e.g., 401, 402, and 403) are not illustrated in FIG. 2, but are illustrated in FIG. 3.

Figure 3:
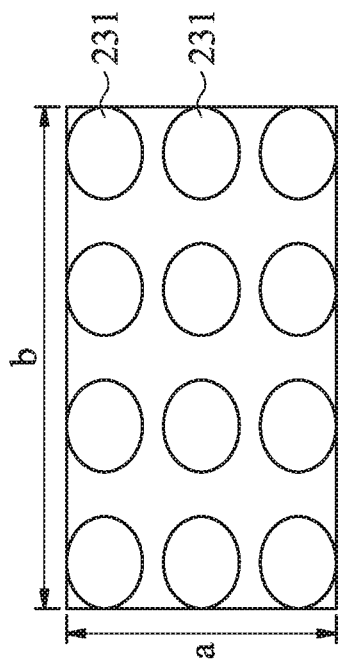
FIG. 3 illustrates conductive bumps within a surface area of an interposer, in some embodiments.
Figure 4B:
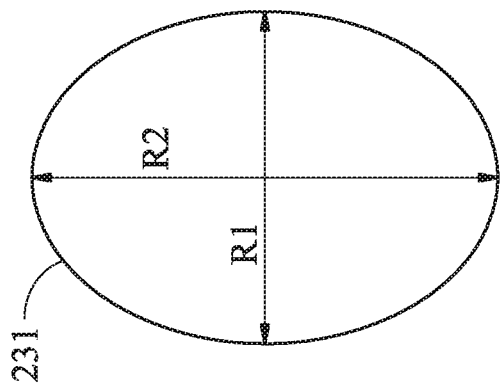
FIGS. 4A and 4B illustrate top views of conductive bumps with different shapes, in some embodiments.
Figure 4A:
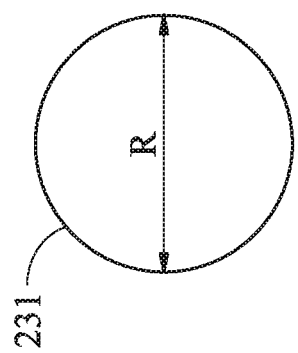

FIG. 3 illustrates an area of the lower surface of the interposer 200 where the conductive bumps 231 are formed. The area illustrated in FIG. 3 may be any of the regions (e.g., 401, 402, and 403) illustrated in FIG. 2, or portions of the regions (e.g., 401, 402, and 403) illustrated in FIG. 2. Examples of the shapes of the bumps 231 in FIG. 3 are illustrated in FIGS. 4A and 4B. In particular, FIG. 4A illustrates a bump 231 having a circular-shaped cross-section with a diameter R, and FIG. 4B illustrates a bump 231 having an oval-shaped cross-section with a first dimension R1 and a second dimension R2, where the second dimension R2 is measured along a longitudinal direction (e.g., a direction along a longitudinal axis of the oval shape) of the oval shape, and the first dimension R1 is measured along a direction perpendicular to the longitudinal direction. In the illustrated embodiment, the shape and the size of the bumps 231 in the plan view of FIG. 3 are the same as those of the cross-section (e.g., along cross-section A-A in FIG. 1) of the bumps 231. Therefore, the shape and the size of the bumps 231 correspond to (e.g., are the same as) those of the bump openings in the mask layer used to form the bumps 231, as discussed above, in some embodiments.

Referring back to FIG. 2, the region 401 represents a region with a first pattern density for the bumps 231, the region 402 represents a region with a second pattern density for the bumps 231, and the region 403 represents a region with a third pattern density for the bumps 231, where the term "pattern density" refers to the density of the bumps 231 within a region (e.g., a region of the lower surface of the interposer 200).

The pattern density of the bumps 231 in a region may be calculated by dividing the total area of the bumps 231 in the region by the area of the region. In the example of FIG. 3, the region illustrated is a rectangular region with a width b and a length a, thus having an area of a×b. The total area of the bumps 231 in the region is a sum of the areas (e.g., the areas of the circular shapes or the oval shapes of the bumps 231 in the plan view of FIG. 3) of the bumps 231 inside the region. In the discussion hereinafter, the pattern density of the bumps 231 in a region may be referred to as the pattern density of the region, or the bump pattern density of the region. In the illustrated embodiment, the region 401 has a pattern density of larger than about 25%, the region 402 has a pattern density between about 15% and about 25%, and the region 403 has a pattern density of less than about 15%. In the discussion hereinafter, the region 401 may be referred to as a high pattern density region, the region 402 may be referred to as a medium pattern density region, and the region 403 may be referred to as a low pattern density region.

In the example of FIG. 2, the region 401 comprises a continuous area (e.g., a rectangular shaped area), the region 402 comprises four separate areas (e.g., four rectangular shaped areas), and the region 403 comprises areas of the lower surface of the interposer 200 other than the regions 401 and 402. The number of regions, the locations of the regions, and the shapes of the regions (e.g., 401, 402, 403) in FIG. 2 are for illustration purpose only and not limiting, other number of regions, other locations of the regions, and other shapes of the regions are also possible and are fully intended to be included within the scope of the present disclosure.

In previous processing, without the present disclosure, the size of the bump openings for forming the bumps 231 in different regions (e.g., 401, 402, and 403) are the same, thus the conductive bumps 231 formed in the different regions have the same cross-section area. However, it is observed that by using the same bump opening size, bumps 231 formed in regions with high pattern density may have a smaller height that bumps 231 formed in regions with low pattern density. The difference in the heights of the conductive bumps 231 in regions with different pattern density may be referred to as a loading effect of (the height of) the conductive bumps 231 due to pattern density variation. The loading effect contributes to the worsening of the coplanarity of the conductive bumps 231. Without being limited to a particular theory, it is believed that during the plating process to form the bumps 231, the chemical fluid has a substantially uniform metal ion concentration, and therefore, regions with high pattern density may have less metal ions per bump 231, thus the bumps 231 formed in high pattern density regions may have a smaller height than the bumps 231 formed in low pattern density regions.

Various methods in the present disclosure reduce the differences in the heights of the bumps 231 in regions with different pattern densities, thus improving the coplanarity of the bumps 231. FIG. 5 illustrates a method for reducing the differences between the heights of the bumps 231 by adjusting the sizes (e.g., cross-section areas) of the bumps 231 such that the sizes of the bumps 231 in different regions (e.g., 401, 402, 403) are different. In particular, the size of the bumps 231 in low pattern density region 403 and the size of the bump 231 in medium pattern density region 402 are increased relative to the size of the bump 231 in high pattern density region 401 (see details below). Note that adjusting the size of the bump 231 may be achieved by adjusting the size of the bump opening in the mask layer use to form the bump 231, as discussed above.

In some embodiments, the method illustrated in FIG. 5 begins by receiving a first layout design (e.g., an existing design used as a starting point for coplanarity improvement using the disclosed method herein) for the conductive bumps 231. The first layout design (may also be referred to as a first design) may include the size (e.g., cross-section area) of the bumps 231 and the locations of the bumps 231. In the discussion below, the layout design of FIG. 2 may be used as an example of the first design, assuming the bumps 231 in all regions (e.g., 401, 402, 403) have a same size (e.g., cross-section area). The design in FIG. 2 is then modified to form a second design that achieves improved coplanarity for the bumps 231, details of which are discussed hereinafter.

Next, the method of FIG. 5 evaluates (e.g., calculates) the bump pattern density in different areas of the lower surface of the interposer 200. Based on the pattern density of the bumps 231 in different areas, the method of FIG. 5 groups the bumps 231 into a high pattern density region 401 (e.g., with pattern density ≥25%), a medium pattern density region 402 (e.g., with pattern density between about 15% and about 25%), or a low pattern density region 403 (e.g., with a pattern density ≤15%). In other words, the method divides the lower surface of the interposer 200 into three regions (see 401, 402, 403 in FIG. 2), such as a high pattern density region 401, a medium pattern density region 402, and a low pattern density region 403.

In some embodiments, determining the boundaries of the different regions (e.g., 401, 402, and 403) may comprise: dividing the lower surface of the interposer 200 into a plurality of non-overlapping, grid-shaped small areas (e.g., rectangular areas with a size of about 1 mm by about 0.5 mm), calculating the bump pattern density in each of the small areas, and assigning each of the small areas to one of the regions (e.g., 401, 402, 403) based on the calculated pattern density. In some embodiments, the first design may have bumps 231 formed in clusters, and each cluster of bumps has a different bump pattern density, in which case the boundary of each cluster of bumps 231 may be used as a boundary for the region to which the cluster of bumps are assigned. These and other ways of determining the boundaries of the different regions are fully intended to be included within the scope of the present disclosure.

Next, the method of FIG. 5 modifies the first layout design to form a second layout design (may also be referred to as a second design). In particular, in the second layout design, the size (e.g., cross-sectional area) of the bumps 231 in the low pattern density region 403 and the size (e.g., cross-sectional area) of the bumps 231 in the medium pattern density region 402 are adjusted (e.g., increased) to be higher than the size (e.g., cross-section area) of the bumps 231 in the high pattern density region 401. The size of the bumps 231 in the high pattern density region 401 remains unchanged between the first layout design and the second layout design, in the illustrated embodiment.

In some embodiments, increasing the sizes (e.g., cross-sectional areas) of the bumps 231 in the low pattern density region and in the medium pattern density region is achieved by increasing the sizes of the bump openings of the mask layer used in, e.g., the plating process to form the bumps 231. In particular, assume that the bumps 231 in the first layout design have a circular shaped with a diameter R in all of the regions (e.g., 401, 402, 403), then applying the method of FIG. 5, the diameter R' of the bump openings (e.g., circular shaped) in the medium pattern density region 402 is adjusted to be between about 1.1 R and about 1.25 R, and the diameter R" of the bump openings in the low pattern density region 403 is adjusted to be between about 1.35 R and about 1.55 R. The diameter of the bump openings in the high pattern density regions 401 remains to be R.

If the openings in the first layout design have an oval shaped with a first dimension R1 and a second dimension R2 in all regions (e.g., 401, 402, 403), then in the second design, the bump openings (e.g., oval shaped) in the medium pattern density region 402 are adjusted to have a first dimension R1' and a second dimension R2', where R1' is between about 1.1 R1 and about 1.25R1, and the second dimension R2' is between about 1.1 R2 and about 1.25 R2. In addition, the bump openings (e.g., oval shaped) in the low pattern density regions 403 are adjusted to have a first dimension R1" and a second dimension R2", where R1" is between about 1.35R1 and about 1.55R1, and the second dimension R2" is between about 1.35R2 and about 1.55R2. The openings in the high pattern density region 401 still have the first dimension R1 and the second dimension R2.

As discussed above, the size of the bump openings in the medium pattern density region 402 and the low pattern density region 403 are adjusted to be larger than the size of the bump openings in the high pattern density region 401 by a pre-determined percentage. Since the size of the bump opening corresponds to (e.g., equals to) the cross-section area of the bump 231 formed subsequently, the conductive bumps 231 formed in regions with different pattern densities using the second layout design have different cross-section areas. In addition, relations between the dimensions of the bump openings in different regions discussed above also apply to the dimensions (e.g., diameter of the circular shape in FIG. 4A, or the first dimension and the second dimension of the oval shape in FIG. 4B) of the conductive bumps 231 formed in the different regions using the second layout design.

The method of FIG. 5 may include additional processing steps such as forming the conductive bumps 231 in accordance with the second layout design. In the example of FIG. 2, the region 401 is a high pattern density region, the region 402 is a medium pattern density region, and the region 403 is a low pattern density region. Therefore, after forming the conductive bumps 231 in accordance with the second layout design, the conductive bumps 231 in the region 403 have a lager cross-section area than the conductive bumps 231 in the region 402, and the conductive bumps 231 in the region 402 have a lager cross-section area than the conductive bumps 231 in the region 401.

As an example, consider a first design where the bump 231 in the high pattern density region 401 have a first dimension R1 of 70 μm and a second dimension R2 of 90 μm. After the bump size in the low pattern density region 403 and in the medium pattern density region 402 are adjusted, in the second design, the bump 231 in the medium pattern density region 402 has a first dimension of 82 μm and a second dimension of 105 μm, and the bump 231 in the low pattern density region 403 has a first dimension of 98 μm and a second dimension of 125 μm.

FIG. 6 illustrates a method of improving the coplanarity of conductive bumps 231, in another embodiment. In the embodiment of FIG. 6, the processing begins by accepting a first design for the conductive bumps 231, and evaluating the bump pattern densities for different areas on the lower surface of the interposer 200. Based on the bump pattern densities in different areas, the conductive bumps 231 are grouped into different regions, such as a high pattern density region 401 (e.g., with pattern density ≥25%), a medium pattern density region 402 (e.g., with pattern density between about 15% and about 25%), or a low pattern density region 403 (e.g., with a pattern density ≤15%). Processing are similar to those discussed above with reference to FIG. 5, thus details are not repeated. In the illustrated embodiment, in the first design, the bump pitch P1 in the high pattern density region 401 is smaller than the bump pitch P2 in the medium pattern density region 402, and the bump pitch P2 in the medium pattern density region 402 is smaller than the bump pitch P3 in the low pattern density region 403.

Next, the first design is modified to generate a second design. In particular, the pitch of the bumps 231 in the low pattern density region 403 and the pitch of the bumps 231 in the medium pattern density region 402 are adjusted to match the pitch of the bumps 231 in the high pattern density region 401. In some embodiments, dummy bumps 231D (see FIG. 7B) are added, e.g., between existing bumps 231, in the low pattern density region 403 and in the medium pattern density region 402 to adjust (e.g., decrease) the bump pitch between adjacent bumps 231/231D, such that the adjusted bump pitches in the low pattern density region 403 and in the medium pattern density region 402 match the bump pitch of the high pattern density region 401, where the dummy bumps 231D are conductive bumps that are electrically isolated (e.g., not electrically coupled to other electrically conductive features). In contrast, each of the conductive bumps 231 is electrically coupled to at least one electrically conductive feature (e.g., a contact pad, a through via 215, or the like) of the interposer 200. The dummy bumps 231D may be formed using a same material(s) and in a same processing step as the bumps 231. Note that here "match" may be a match between the pitches within the limitations of the manufacturing, or a match between the pitches within a percentage. For example, the bump pitches in the low pattern density region 403 and the medium pattern density region 402 are within a pre-determined percentage (e.g., within ±15%, ±10%, or ±5%) of the bump pitch in the high pattern density region 401.

As an example, consider a first design where the bump pitch P1 in the high pattern density region 401 is 150 µm, the bump pitch P2 in the medium pattern density region 402 is 180 µm, and the bump pitch P3 in the low pattern density region 403 is 250 µm. After modifying the bump pitches, the bump pitch for the bumps 231 in all regions (e.g., 401, 402, 403) have a same bump pitch of 150 µm.

In the illustrated embodiment, the cross-section areas of the bumps 231 in the different regions (e.g., 401, 402, 403) are not changed between the first design and the second design. In some embodiments, the cross-section areas of the bumps 231 in the different regions (e.g., 401, 402, 403) are the same. The method of FIG. 6 may include additional processing steps such as forming the bumps 231 and the dummy bumps 231D in accordance with the second design.

FIGS. 7A and 7B illustrate the design for conductive bumps 231 within an area of the lower surface of the interposer 200 before and after applying the method illustrated in FIG. 6, respectively, in an embodiment. The area illustrated in FIGS. 7A and 7B may be, e.g., an area in the low pattern density region 403 or an area in the medium pattern density region 402. As illustrated in FIG. 7A, the pitch between bumps 231 in the first design is, e.g., 250 µm. FIG. 7B shows dummy bumps 231D being formed between the bumps 231. For example, the dummy bumps 231D may be formed between adjacent bumps 231 in a same row. In addition, FIG. 7B also illustrates a row of dummy bumps 231D (inside dashed rectangular 600) formed between two adjacent rows of bumps 231. With the dummy bumps 231D formed, the pitch of the bumps (e.g., 231 and 231D) is reduced to, e.g., 125 µm to match the pitch density of the high pattern density region 401.

Figure 8A:
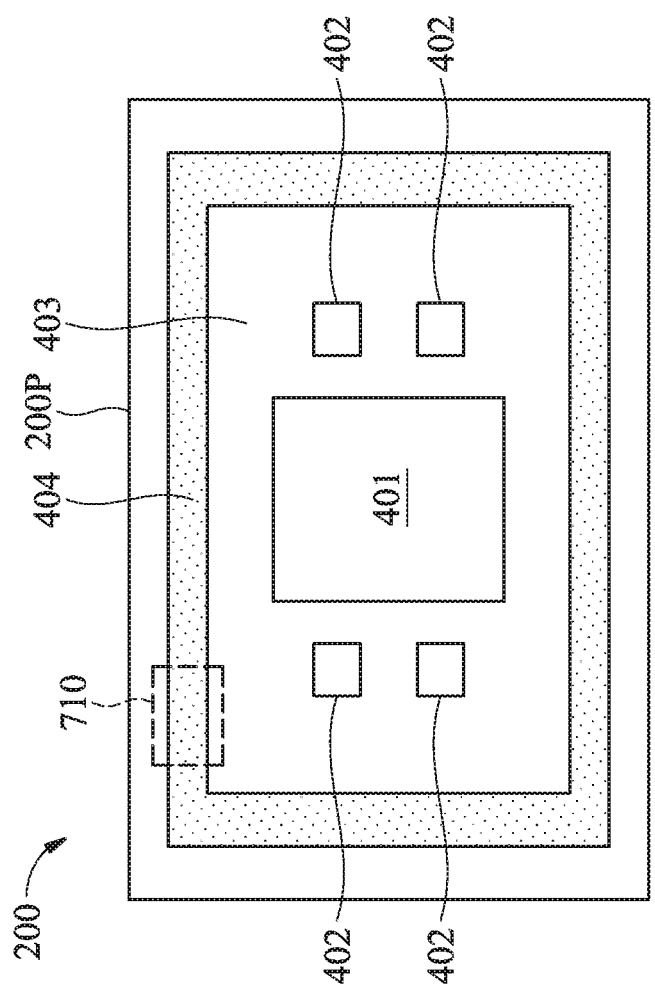
FIG. 8A illustrates a layout for conductive bumps on a surface of an interposer, in some embodiments.

FIG. 8A illustrates a layout design for conductive bumps 231 on the lower surface of the interposer 200 using an embodiment method. In the example of FIG. 8A, a first design (see, e.g., FIG. 2) is received and evaluated. The pattern densities for different areas of the first design are calculated. Based on the pattern densities calculated, bumps 231 are grouped into different regions such as a high pattern density 401 (e.g., with pattern density ≥25%), a medium pattern density region 402 (e.g., with pattern density between about 15% and about 25%), and a low pattern density region 403 (e.g., with a pattern density ≤15%). The cross-section areas of the bumps 231 in different regions (e.g., 401, 402, 403) are the same in the embodiment of FIG. 8A. In FIG. 8A, the high pattern density region 401 has a bump pitch P1, the medium pattern density region 402 has a bump pitch P2, and the low pattern density region 403 has a bump pitch P3. In the illustrated embodiment, the bump pitch P1 is smaller than the bump pitch P2, and the bump pitch P2 is smaller than the bump pitch P3.

To reduce the differences in the heights of the conductive bumps 231 in regions with different pattern densities, the embodiment method of FIG. 8A modifies the first design to form a second design by adding dummy bumps 231D (see FIG. 8B) in a region 404 (illustrated with hatch pattern in FIG. 8A) disposed along perimeters 200P (e.g., sidewalls) of the interposer 200, such that the bump pitch P4 in the region 404 matches the bump pitch P1 in the high pattern density region 401. Note that here "match" may be a match between the pitches within the limitations of the manufacturing, or a match between the pitches within a percentage (e.g., within ±15%, ±10%, or ±5%) of the bump pitch in the high pattern density region 401.

As illustrated in FIG. 8A, the region 404 has a hollow rectangular shape, although other suitable shapes are also contemplated within the scope of the present disclosure. The region 404 may be chosen to include the N outermost rows and/or the N outermost columns of bumps 231 on the lower surface of the interposer 200 in the first design, where N is a number between 5 and 15, such as 5, 10, or 15. In other words, there is no bump (231 or 231D) between the region 404 and the perimeters 200P of the interposer 200. Therefore, in the second design, the region 404 has both dummy bumps 231D and conductive bumps 231 formed within, and the other regions (e.g., 401, 402, and 403) in FIG. 8A only has conductive bumps 231 (e.g., not dummy bumps 231D) formed within.

In the illustrated embodiment of FIG. 8A, the region 404 surrounds the high pattern density region 401, the medium pattern density regions 402, and the low pattern density region 403. Note that in FIG. 8A, the region 404 comprises areas previously belonging to the low pattern density region 403. Therefore, in the second design illustrated in FIG. 8A, the region 403 includes areas of the lower surface of the interposer 200 that are inside the region 404, but other than the regions 401/402.

As an example, consider a first design where the bump pitch P1 in the high pattern density region 401 is 150 µm, the bump pitch P2 in the medium pattern density region 402 is 180 µm, and the bump pitch P3 in the low pattern density region 403 is 250 µm. In the second design, the dummy bumps 231D are formed in the region 404, such that the bump pitch P4 between bumps (e.g., between 231 and 231D) is 150 µm. The method of FIG. 8A may include additional processing steps, such as forming the bumps 231 and the dummy bumps 231D in accordance with the second design.

In the embodiment of FIG. 8A, the cross-section areas of the bumps 231 in all regions (401, 402, and 403) are the same, and are not changed between the first design and the second design. Furthermore, the cross-section area of the dummy bumps 231D in the region 404 is the same as the cross-section area of the conductive bumps 231, in the illustrated embodiment.

Figure 8B:
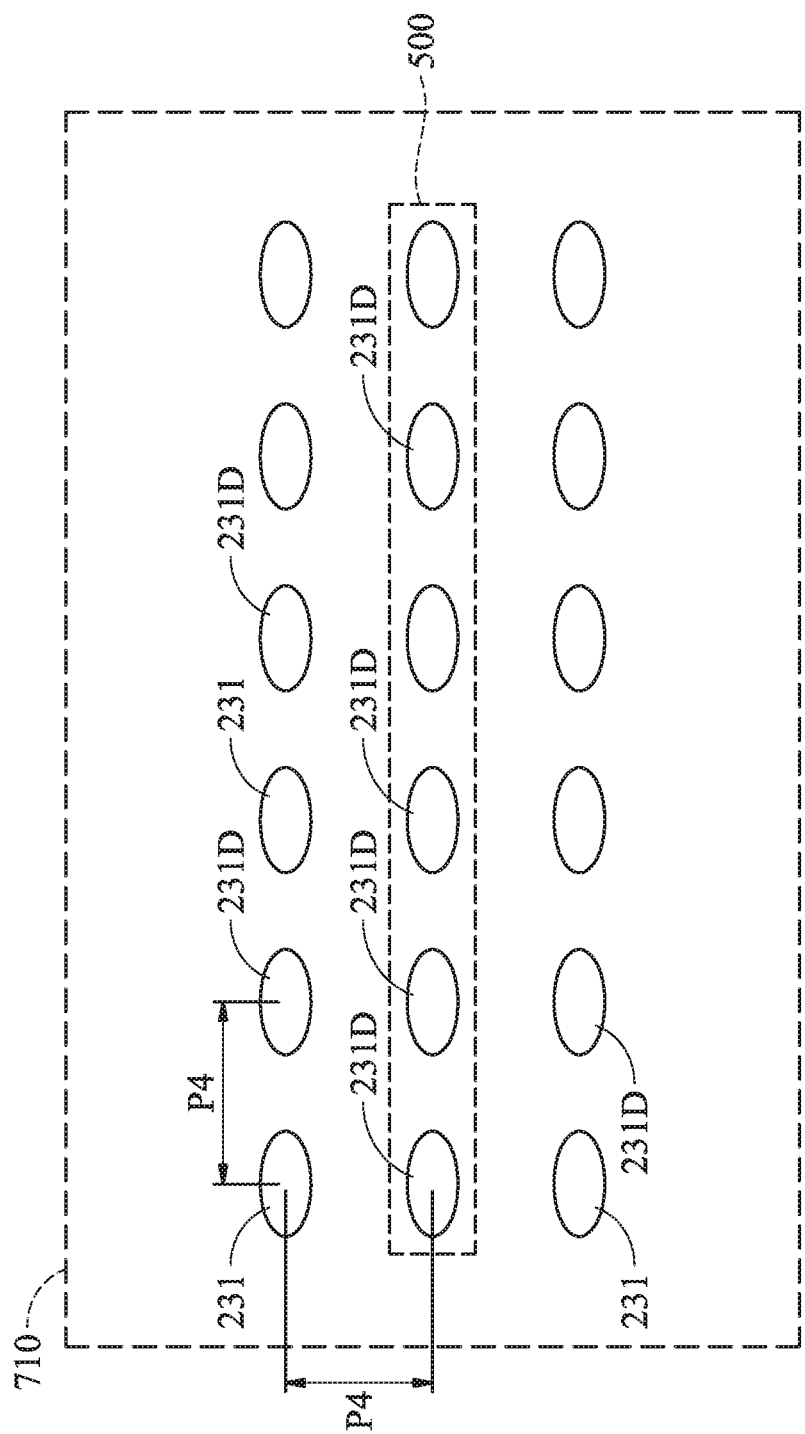
FIG. 8B illustrates a zoomed-in view of a portion of the layout illustrated in FIG. 8A.

FIG. 8B illustrates a zoomed-in view of a portion 710 of the region 404 illustrated in FIG. 8A. As illustrated in FIG. 8B, the dummy bumps 231D are formed between bumps 231. FIG. 8B also illustrates a row of dummy bumps 231D (in dashed rectangle 500) being formed between two rows of conductive bumps 231. The bump pitch (e.g., between 231 and 231D) of the region 404 is P4, where P4 matches the bum pitch P1 of the high pattern density region 401.

Variations to the disclosed embodiments are possible and are fully intended to be included within the scope of the present disclosure. For example, while the various embodiment methods adjust the bump size (e.g., cross-section area) or the bum pitch, it is possible to improve the coplanarity of the bumps 231 by adjusting both the bump size and the bump pitch. For example, the bump opening sizes in various regions (e.g., 401, 402, 403) may be adjusted while the bump pitches in various regions are adjusted. In addition, while the disclosure are described in the context of forming conductive bumps 231 on the lower surface of the interposer 200, the disclosed methods may be used to improve the coplanarity of conductive bumps formed on other components and/or on other surfaces (e.g., upper surface instead of lower surface).

Embodiments may achieve advantages. By adjusting the bump size (e.g., cross-section area) or the bump pitch in the design of the conductive bumps 231, the differences between the bump heights in regions with different pattern densities are reduced, and the coplanarity of the conductive bumps are improved. The improved coplanarity avoids or reduces issues such as cold joints (e.g., poorly formed solder regions that fail to properly bond conductive bumps of two devices) or bridging of bumps, thus resulting in improved reliability of the device formed and improved production yield. Without the presently disclosed methods, in order to meet the requirement for coplanarity of the conductive bumps, a reference method may have to reduce the speed of electro-plating, and/or may have to increase the metal ion concentration (e.g., concentration of Ag) in the chemical fluid used for the electro-plating, which reduces the throughput of production and increases the manufacturing cost. The present disclosure avoids these issues, thus achieving increased throughput (e.g., higher electro-plating speed) and reduced manufacturing cost.

Figure 9:
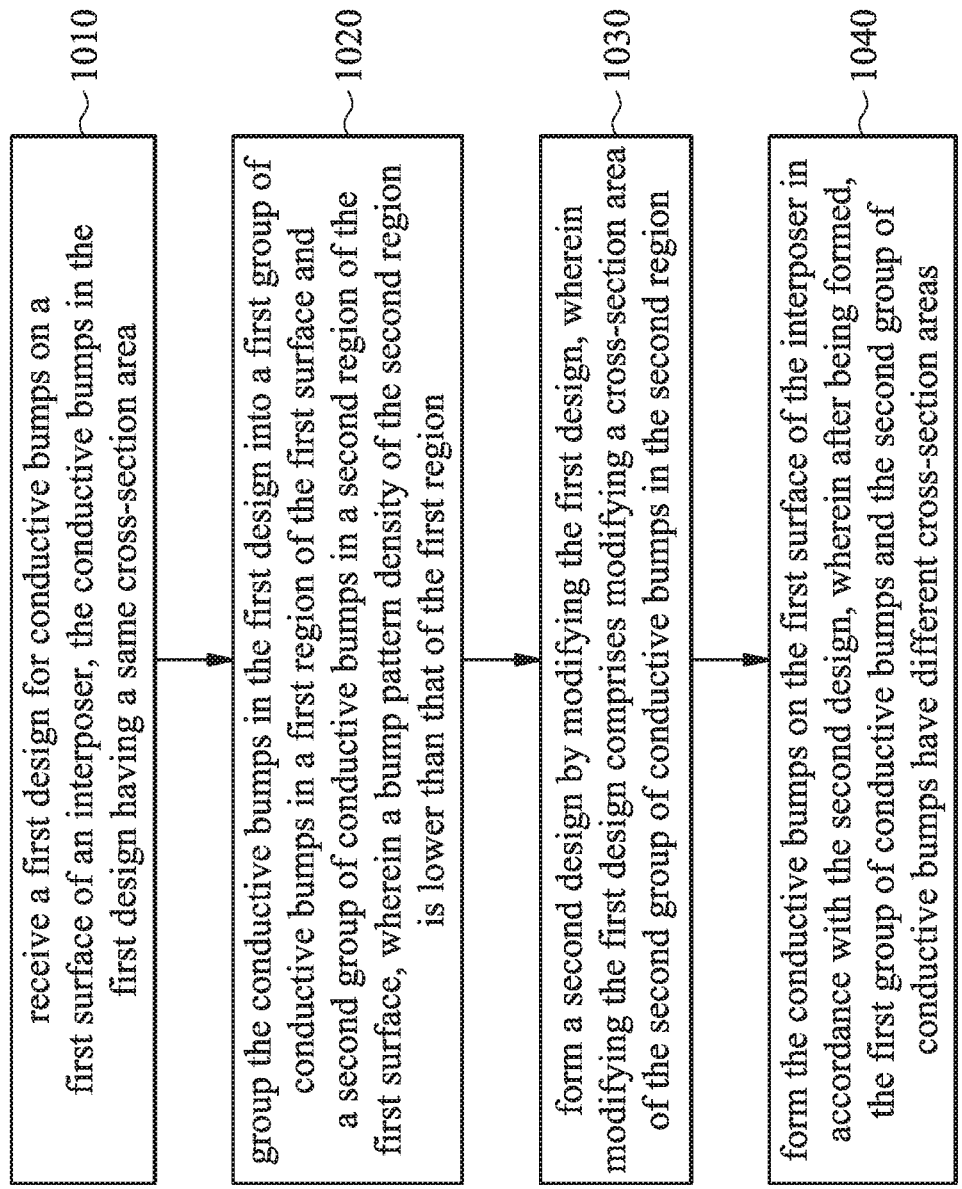
FIG. 9 illustrates a flow chart for a method of forming a semiconductor device, in some embodiments.
Figure 10:
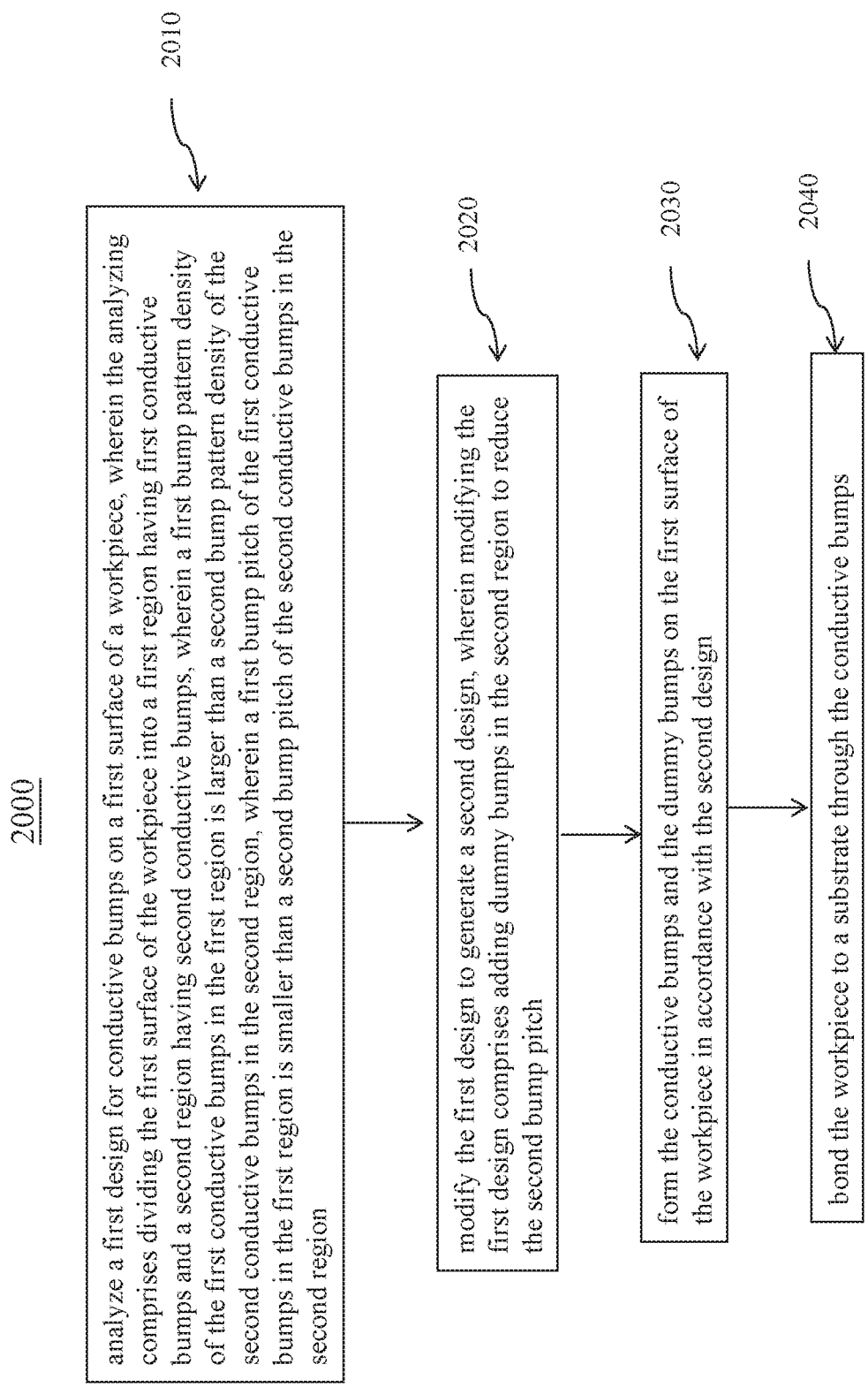
FIG. 10 illustrates a flow chart for a method of forming a semiconductor device, in some embodiments.
Figure 11:
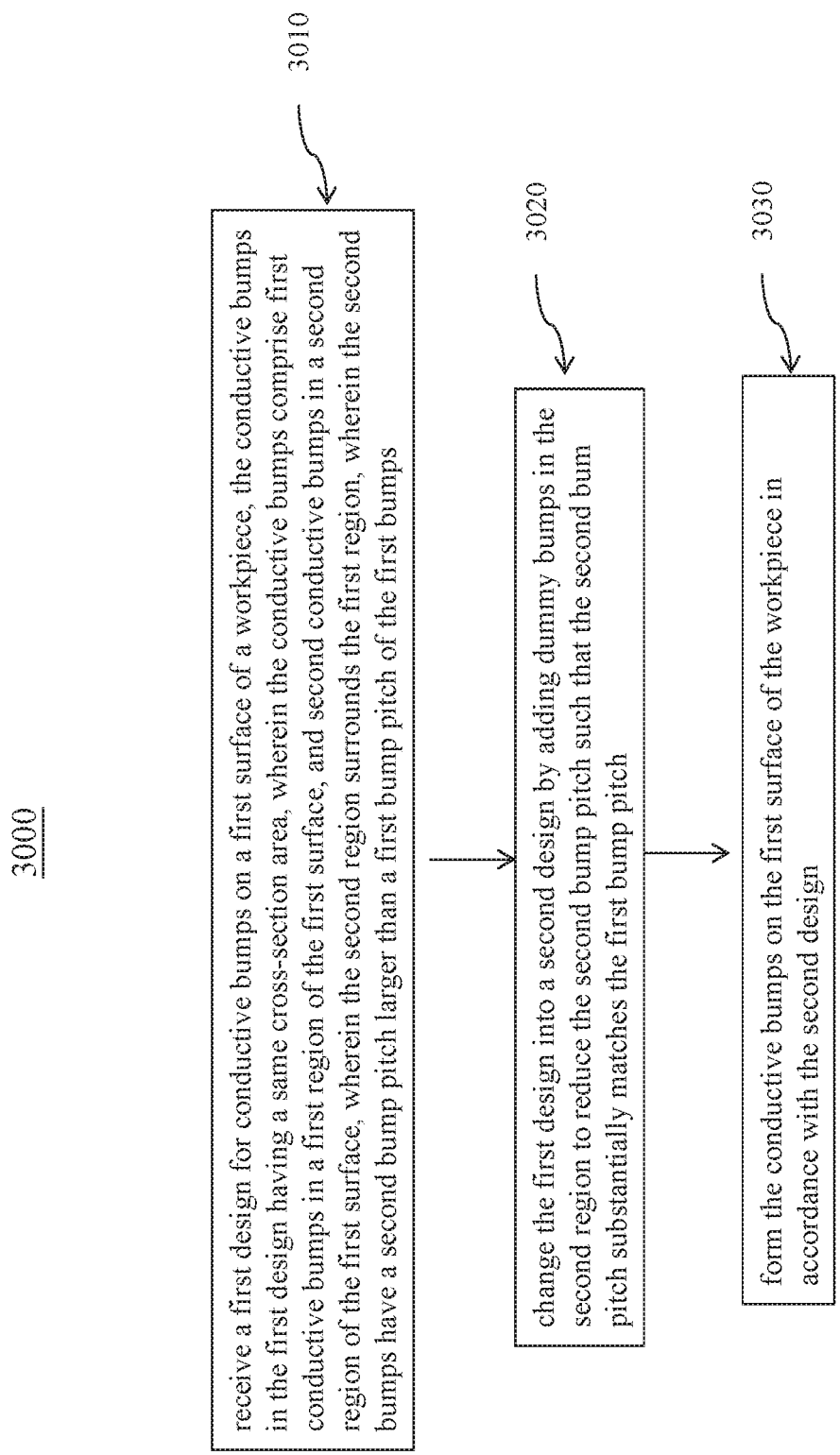
FIG. 11 illustrates a flow chart for a method of forming a semiconductor device, in some embodiments.

FIGS. 9, 10, and 11 illustrate, respectively, flow charts of methods 1000, 2000, and 3000 of fabricating a semiconductor device, in accordance with some embodiments. It should be understood that the embodiment methods shown in FIGS. 9, 10, and 11 are merely examples of many possible embodiment methods. One of ordinary skill in the art would recognize many variations, alternatives, and modifications. For example, various steps as illustrated in FIGS. 9, 10, and 11 may be added, removed, replaced, rearranged and repeated.

Referring to FIG. 9, at block 1010 of the method 1000, a first design for conductive bumps on a first surface of an interposer is received, the conductive bumps in the first design having a same cross-section area. At block 1020, the conductive bumps in the first design are grouped into a first group of conductive bumps in a first region of the first surface and a second group of conductive bumps in a second region of the first surface, wherein a bump pattern density of the second region is lower than that of the first region. At block 1030, a second design is formed by modifying the first design, wherein modifying the first design comprises modifying a cross-section area of the second group of conductive bumps in the second region. At block 1040, the conductive bumps are formed on the first surface of the interposer in accordance with the second design, wherein after being formed, the first group of conductive bumps and the second group of conductive bumps have different cross-section areas.

Referring to FIG. 10, at block 2010 of the method 2000, a first design for conductive bumps on a first surface of a workpiece is analyzed, wherein the analyzing comprises dividing the first surface of the workpiece into a first region having first conductive bumps and a second region having second conductive bumps, wherein a first bump pattern density of the first conductive bumps in the first region is larger than a second bump pattern density of the second conductive bumps in the second region, wherein a first bump pitch of the first conductive bumps in the first region is smaller than a second bump pitch of the second conductive bumps in the second region. At block 2020, the first design is modified to generate a second design, wherein modifying the first design comprises adding dummy bumps in the second region to reduce the second bump pitch. At block 2030, the conductive bumps and the dummy bumps are formed on the first surface of the workpiece in accordance with the second design. At block 2040, the workpiece is bonded to a substrate through the conductive bumps.

Referring to FIG. 11, at block 3010 of the method 3000, a first design for conductive bumps on a first surface of a workpiece is received, the conductive bumps in the first design having a same cross-section area, wherein the conductive bumps comprise first conductive bumps in a first region of the first surface, and second conductive bumps in a second region of the first surface, wherein the second region surrounds the first region, wherein the second bumps have a second bump pitch larger than a first bump pitch of the first bumps. At block 3020, the first design is changed into a second design by adding dummy bumps in the second region to reduce the second bump pitch such that the second bum pitch substantially matches the first bump pitch. At block 3030, the conductive bumps are formed on the first surface of the workpiece in accordance with the second design.

In an embodiment, a method includes receiving a first design for conductive bumps on a first surface of an interposer, the conductive bumps in the first design having a same cross-section area; grouping the conductive bumps in the first design into a first group of conductive bumps in a first region of the first surface and a second group of conductive bumps in a second region of the first surface, where a bump pattern density of the second region is lower than that of the first region; forming a second design by modifying the first design, where modifying the first design includes modifying a cross-section area of the second group of conductive bumps in the second region; and forming the conductive bumps on the first surface of the interposer in accordance with the second design, where after being formed, the first group of conductive bumps and the second group of conductive bumps have different cross-section areas. In an embodiment, a size of the first group of conductive bumps remain unchanged in the first design and the second design. In an embodiment, forming the conductive bumps comprises: forming a patterned mask layer over the first surface of the interposer, the patterned mask layer having bump openings; and performing a plating process to form a conductive material in the bump openings of the patterned mask layer. In an embodiment, a size of the bump openings in the first region is smaller than a size of the bump openings in the second region. In an embodiment, a bump pattern density of the first region is larger than about 25%. In an embodiment, in the second design, the first group of conductive bumps has a first cross-section with a first dimension, and the second group of conductive bumps have a second cross-section with a respective second dimension, wherein the second dimension is between about 1.1 times and about 1.25 times of the first dimension if the bump pattern density of the second region is between about 15% and about 25%, and wherein the second dimension is between about 1.35 times and about 1.55 times of the first dimension if the bump pattern density of the second region is smaller than about 15%. In an embodiment, grouping the conductive bumps in the first design further comprises grouping a third group of conductive bumps in a third region of the first surface, wherein a bump pattern density of the third region is lower than that of the second region. In an embodiment forming the second design further comprises modifying a cross-section area of the third group of conductive bumps in the third region. In an embodiment, a bump pattern density of the first region is larger than about 25%, the bump pattern density of the second region is between about 15% and about 25%, and the bump pattern density of the third region is smaller than about 15%. In an embodiment, in the second design, the first group of conductive bumps has a first cross-section with a first dimension, the second groups of conductive bumps has a second cross-section with a respective second dimension, and the third group of conductive bumps has a third cross-section with a respective third dimension, wherein the second dimension is between about 1.1 times and about 1.25 times of the first dimension, and the third dimension is between about 1.35 times and about 1.55 times of the first dimension. In an embodiment, the first cross-section, the second cross-section, and the third cross-section are geometrically similar shapes. In an embodiment, the method further comprises attaching a substrate to the conductive bumps of the interposer.

In an embodiment, a method includes analyzing a first design for conductive bumps on a first surface of a workpiece, wherein the analyzing comprises dividing the first surface of the workpiece into a first region having first conductive bumps and a second region having second conductive bumps, wherein a first bump pattern density of the first conductive bumps in the first region is larger than a second bump pattern density of the second conductive bumps in the second region, wherein a first bump pitch of the first conductive bumps in the first region is smaller than a second bump pitch of the second conductive bumps in the second region; modifying the first design to generate a second design, wherein modifying the first design comprises adding dummy bumps in the second region to reduce the second bump pitch; forming the conductive bumps and the dummy bumps on the first surface of the workpiece in accordance with the second design; and bonding the workpiece to a substrate through the conductive bumps. In an embodiment, the first bump pattern density is larger than about 25%. In an embodiment, the dummy bumps are formed of a same material as the conductive bumps, and the dummy bumps are electrically isolated.

In an embodiment, a semiconductor device includes a die attached to an upper surface of an interposer; first conductive bumps in a first region of a lower surface of the interposer, the first region having a first bump pattern density; second conductive bumps in a second region of the lower surface of the interposer, the second region having a second bump pattern density smaller than the first bump pattern density; and dummy bumps in a perimeter region of the lower surface of the interposer, the perimeter region surrounding the first region and the second region. In an embodiment, the first conductive bumps in the first region have a first bump pitch, the second conductive bumps in the second region have a second bump pitch larger than the first bump pitch, and the dummy bumps in the perimeter region have a third bump pitch that matches the first bump pitch. In an embodiment, the semiconductor device further includes third conductive bumps in a third region of the lower surface of the interposer, the third region having a third bump pattern density smaller than the second bump pattern density, the third region having a fourth bump pitch larger than the second bum pitch, wherein the perimeter region surrounds the first region, the second region, and the third region. In an embodiment, the first bump pattern density is larger than about 25%. In an embodiment, the first conductive bumps and the second conductive bumps have a same cross-section area.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
    receiving a first design for conductive bumps, wherein the conductive bumps in the first design are on a first surface of an interposer, the conductive bumps in the first design having a same width and a same length in a plan view, the conductive bumps comprising:
        a first group of conductive bumps in a first region of the first surface, the first region having a first bump pattern density; and
        a second group of conductive bumps in a second region of the first surface, the second region having a second bump pattern density lower than the first bump pattern density of the first region;
    forming a second design for the conductive bumps by modifying the first design, wherein modifying the first design comprises modifying a width or a length of the second group of conductive bumps in the second region; and
    forming the conductive bumps on the first surface of the interposer in accordance with the second design, wherein forming the conductive bumps comprises:
        forming a patterned mask layer over the first surface of the interposer, the patterned mask layer having bump openings; and
        performing a plating process to form a conductive material in the bump openings of the patterned mask layer, wherein after being formed, the first group of conductive bumps and the second group of conductive bumps have different widths or different lengths in the plan view.

2. The method of claim 1, wherein a width and a length of the first group of conductive bumps in the plan view remain unchanged between the first design and the second design.

3. The method of claim 1, wherein a size of the bump openings in the first region is smaller than a size of the bump openings in the second region.

4. The method of claim 1, wherein the first bump pattern density of the first region is larger than about 25%.

5. The method of claim 4, wherein in the second design, the first group of conductive bumps has a first width in the plan view, and the second group of conductive bumps have a second width in the plan view, wherein the second width is between about 1.1 times and about 1.25 times of the first width if the second bump pattern density of the second region is between about 15% and about 25%, and wherein the second width is between about 1.35 times and about 1.55 times of the first width if the second bump pattern density of the second region is smaller than about 15%.

6. The method of claim 1, wherein the conductive bumps in the first design further comprises a third group of conductive bumps in a third region of the first surface, wherein a third bump pattern density of the third region is lower than the second bump pattern density of the second region.

7. The method of claim 6, wherein forming the second design further comprises modifying a width or a length of the third group of conductive bumps in the plan view.

8. The method of claim 7, wherein the first bump pattern density of the first region is larger than about 25%, the second bump pattern density of the second region is between about 15% and about 25%, and the third bump pattern density of the third region is smaller than about 15%.

9. The method of claim 8, wherein in the second design, the first group of conductive bumps has a first width in the plan view, the second groups of conductive bumps has a second width in the plan view, and the third group of conductive bumps has a third width in the plan view, wherein the second width is between about 1.1 times and about 1.25 times of the first width, and the third width is between about 1.35 times and about 1.55 times of the first width.

10. The method of claim 9, wherein in the plan view, the first group of conductive bumps, the second group of conductive bumps, and the third group of conductive bumps are geometrically similar shapes.

11. The method of claim 1, further comprising attaching a substrate to the conductive bumps of the interposer.

12. A method comprising:
receiving a first design, the first design comprising conductive bumps on an interposer, the conductive bumps in the first design having a same width and a same length in a plan view, the conductive bumps in the first design include a first group of conductive bumps in a first region of a first side of the interposer and include a second group of conductive bumps in a second region of the first side of the interposer, wherein the first group of conductive bumps has a first bump pattern density within a first pre-determined range, the second group of conductive bumps has a second bump pattern density within a second pre-determined range, and the first bump pattern density is higher than the second bump pattern density;
modifying the first design to form a second design for the conductive bumps by increasing a width and a length of the second group of conductive bumps in the plan view while keeping a width and a length of the first group of conductive bumps in the plan view unchanged from the first design; and
forming the conductive bumps on the interposer in accordance with the second design, wherein forming the conductive bumps comprises:
forming a patterned mask layer over the first side of the interposer, the patterned mask layer having bump openings; and
performing a plating process to form a conductive material in the bump openings of the patterned mask layer.

13. The method of claim 12, wherein after being formed, the first group of conductive bumps and the second group of conductive bumps have different widths and lengths in the plan view.

14. The method of claim 12, wherein the first pre-determined range is above about 25%, and the second pre-determined range is between about 15% and about 25%.

15. The method of claim 14, wherein modifying the first design comprises increasing the width and the length of the second group of conductive bumps by about 10% to about 25%.

16. The method of claim 12, wherein the first pre-determined range is above about 25%, and the second pre-determined range is less than about 15%.

17. The method of claim 16, wherein modifying the first design comprises increasing the width and the length of the second group of conductive bumps by about 35% to about 55%.

18. A method comprising:
modifying a first design for conductive bumps into a second design for the conductive bumps, wherein the conductive bumps in the first design have a same width and a same length in a plan view and are on a first side of an interposer,
wherein the conductive bumps of the first design comprise:
a first group of conductive bumps in a first region of the first side of the interposer and having a first bump pattern density; and
a second group of conductive bumps in a second region of the first side of the interposer and having a second bump pattern density, wherein the first bump pattern density is higher than the second bump pattern density; and
wherein modifying the first design comprises increasing a width or a length of the second group of conductive bumps in the plan view; and
forming the conductive bumps on the first side of the interposer in accordance with the second design, wherein forming the conductive bumps comprises:
forming a patterned mask layer over the first side of the interposer, the patterned mask layer having bump openings; and
performing a plating process to form a conductive material in the bump openings of the patterned mask layer.

19. The method of claim 18, wherein across width and a length of the first group of conductive bumps in the plan view remain unchanged between the first design and the second design.

* * * * *